US008993888B2

(12) United States Patent
Chamberlain et al.

(10) Patent No.: US 8,993,888 B2
(45) Date of Patent: Mar. 31, 2015

(54) TONEABLE CONDUIT OPTIMIZED FOR CONDUIT SHRINKAGE AND ELONGATION

(71) Applicant: CommScope, Inc. of North Carolina, Hickory, NC (US)

(72) Inventors: John Chamberlain, Hickory, NC (US); Jason Morrow, Taylorsville, NC (US)

(73) Assignee: CommScope, Inc. of North Carolina, Hickory, NC (US)

( * ) Notice: Subject to any disclaimer, the term of this patent is extended or adjusted under 35 U.S.C. 154(b) by 269 days.

(21) Appl. No.: 13/662,749

(22) Filed: Oct. 29, 2012

(65) Prior Publication Data

US 2014/0116747 A1 May 1, 2014

(51) Int. Cl.
| | | |
|---|---|---|
| *H02G 3/04* | (2006.01) | |
| *B29C 47/02* | (2006.01) | |
| *G01V 3/12* | (2006.01) | |
| *F16L 1/11* | (2006.01) | |
| *H02G 9/06* | (2006.01) | |
| *G02B 6/44* | (2006.01) | |

(52) U.S. Cl.
CPC ... *G01V 3/12* (2013.01); *F16L 1/11* (2013.01); *H02G 9/06* (2013.01); *G02B 6/4459* (2013.01); *G02B 6/447* (2013.01)
USPC .......................................... 174/95; 264/176.1

(58) Field of Classification Search
USPC .......................................... 174/95; 264/176.1
See application file for complete search history.

(56) References Cited

U.S. PATENT DOCUMENTS

| | | | |
|---|---|---|---|
| 2,647,160 A | 7/1953 | Hood | |
| 2,722,237 A | 11/1955 | Rosel | |
| 3,086,557 A | 4/1963 | Peterson | |
| 3,367,370 A * | 2/1968 | Sherlock | 138/104 |

(Continued)

FOREIGN PATENT DOCUMENTS

| | | |
|---|---|---|
| DE | 2248441 | 4/1974 |
| EP | 159307 | 10/1985 |

(Continued)

OTHER PUBLICATIONS

Toneable Duct—Specialized Locatable Duct, Product brochure, Sep. 1998, Pyramid Industries, Inc., 100 State St, Suite 200, Erie, PA.

(Continued)

*Primary Examiner* — Timothy Thompson
*Assistant Examiner* — Charles Pizzuto
(74) *Attorney, Agent, or Firm* — Muncy, Geissler, Olds & Lowe, P.C.

(57) ABSTRACT

A toneable conduit including an elongate polymeric tube having a sidewall with an interior surface and an exterior surface. The interior surface defines a main channel. A sub-channel, smaller in cross sectional area than the main channel, extends longitudinally between the exterior and interior surfaces of the tube. A continuous toning signal wire is located within the sub-channel. The sub-channel has a larger cross sectional area than a cross sectional area of the toning signal wire and the toning signal wire follows a zigzagging or undulating path within the sub-channel. Alternatively, the sub-channel and toning signal wire have a substantially common cross sectional area and both follow a zigzagging or undulating path from one end of the toneable conduit to the other end. In both embodiments, a given length of toneable conduit will include a length of toning signal wire exceeding that given length.

20 Claims, 8 Drawing Sheets

(56) References Cited

U.S. PATENT DOCUMENTS

| | | | |
|---|---|---|---|
| 3,383,456 A | | 5/1968 | Kosak |
| 3,555,170 A | * | 1/1971 | Petzetakis .................. 174/47 |
| 3,580,983 A | | 5/1971 | Jackson |
| 3,713,947 A | | 1/1973 | Hawkins |
| 3,748,371 A | | 7/1973 | Krook et al. |
| 4,109,941 A | | 8/1978 | Wood et al. |
| 4,817,673 A | | 4/1989 | Zoghby et al. |
| 5,006,806 A | | 4/1991 | Rippingale et al. |
| 5,017,873 A | | 5/1991 | Rippingale et al. |
| 5,045,368 A | | 9/1991 | Cosman et al. |
| 5,051,034 A | | 9/1991 | Goodman |
| 5,061,823 A | | 10/1991 | Carroll |
| 5,114,517 A | | 5/1992 | Rippingale et al. |
| 5,212,349 A | | 5/1993 | Pelzer |
| 5,227,103 A | | 7/1993 | Muschiatti |
| 5,243,128 A | | 9/1993 | Marcoz |
| RE34,701 E | | 8/1994 | Goodman |
| 5,415,242 A | | 5/1995 | Pelzer |
| 5,532,598 A | | 7/1996 | Clark, Jr. et al. |
| 5,812,358 A | | 9/1998 | Kawai et al. |
| 5,998,081 A | | 12/1999 | Morrison et al. |
| 6,005,191 A | | 12/1999 | Tzeng et al. |
| 6,053,457 A | | 4/2000 | Ozga et al. |
| 6,068,426 A | | 5/2000 | Blanquet et al. |
| 6,092,558 A | | 7/2000 | Maccario |
| 6,105,649 A | | 8/2000 | Levingston et al. |
| 6,131,265 A | | 10/2000 | Bird |
| 6,135,159 A | | 10/2000 | Karl |
| 6,139,068 A | | 10/2000 | Burress et al. |
| 6,139,957 A | | 10/2000 | Craton |
| 6,933,438 B1 | | 8/2005 | Watts et al. |
| 7,279,643 B2 | * | 10/2007 | Morrow et al. ................ 174/481 |
| 7,361,835 B2 | * | 4/2008 | Morrow et al. .............. 174/68.1 |
| 7,820,090 B2 | | 10/2010 | Morrow et al. |
| 7,880,087 B2 | * | 2/2011 | Morrow ....................... 174/68.1 |
| 8,497,425 B2 | * | 7/2013 | Morrow ....................... 174/68.1 |
| 2003/0094298 A1 | | 5/2003 | Morrow et al. |
| 2009/0314513 A1 | * | 12/2009 | Morrow ........................... 174/96 |
| 2011/0005802 A1 | * | 1/2011 | Morrow ........................... 174/96 |

FOREIGN PATENT DOCUMENTS

| | | |
|---|---|---|
| EP | 0449795 | 10/1991 |
| GB | 2197419 | 5/1988 |
| JP | 05-106765 | 4/1993 |
| JP | 05-106766 | 4/1993 |
| JP | 05-106779 | 4/1993 |
| RU | 2246068 | 4/2000 |
| WO | WO 96/15894 | 5/1996 |

OTHER PUBLICATIONS

Article from www.duraline.com regarding tracer product dated Aug. 8, 2001.
Advertisement by Pyramid Industries, Inc. regarding the Toneable Duct Product. Publication date unknown but prior to Aug. 7, 2001.

* cited by examiner

TONEABLE CONDUIT OPTIMIZED FOR CONDUIT SHRINKAGE AND ELONGATION

BACKGROUND OF THE INVENTION

1. Field of the Invention

The present invention relates to toneable conduit and more particularly to toneable conduit that can be detected by conventional toning equipment.

2. Description of the Related Art

Conduit is often buried to provide an underground path for cables such as coaxial cables and fiber optic cables. In particular, conduit is typically formed of a plastic material that protects the coaxial cables and fiber optic cables from the moisture and other hazards of the underground environment. The cable is typically installed in the conduit by pulling the cable through the installed conduit, although the cable can be provided in the conduit prior to installing the conduit underground.

One issue with conduit is that it can be difficult to locate underground when it is either empty or it contains only nonmetallic cables, such as fiber optic cables. As a result, conduit has often been outfitted with a metallic or magnetic strip or wire that allows the conduit to be detected by metal detecting equipment on the ground surface. Although these types of detection devices are useful, they cannot always locate conduit that is buried deep underground (e.g., greater than five feet). Toning equipment is commonly used that operates by transmitting a specific signal along a metallic wire or strip associated with the conduit and detecting the signal from the ground surface using a detector tuned to the specific signal.

One conventional conduit construction that can be detected by conventional metal detection devices and the toning devices discussed above includes an exterior rib that houses the metallic ribbon or wire. For example, Japanese published application JP 5-106765 describes an embodiment that includes an exterior rib including a conductive wire. Although these types of constructions have found use, it is difficult to couple this conduit with another conduit because the exterior rib prevents the connector coupling from fitting flush with the exterior surface of the conduit. As a result, moisture can enter the conduit at the connection and can cause damage to the cable installed therein. In addition, the exterior rib can cause problems during installation in that the exterior rib and associated wire can be ripped off of the conduit if the conduit is being installed by directional boring or plowing methods.

Another conduit construction that is designed to be detected by metal detection devices includes a metallic ribbon or wire that is provided at intermittent lengths. For example, U.S. Pat. No. 6,092,558 describes such an embodiment wherein discrete lengths of a magnetic strip are spaced apart longitudinally along the conduit. U.S. Pat. No. 5,045,368 also describes a similar construction having markers at intervals along the length of the conduit. Although this type of conduit can be detected by the metal detection devices discussed above, it cannot be detected by conventional toning equipment because a signal cannot be transmitted along the conduit.

Alternatively, some conduit constructions use continuous lengths of strip or ribbon formed of metal or a magnetic material to allow the conduit to be detected by metal detecting equipment. For example, U.S. Pat. Nos. 5,051,034 and RE 34,701 describe this type of construction and use a ribbon of magnetic material to allow the conduit to be detected at three to five feet underground. U.S. Pat. Nos. 5,006,086; 5,017,873; and 5,114,517 use a magnetic ribbon that is spirally wound around the exterior surface of the conduit. Although the strip or ribbon in these constructions can be detected by conventional metal detecting equipment, it does not have a suitable construction for transmitting a toning signal for extended distances and at the depths desired in the art.

As demonstrated above, there is a need in the art to provide a conduit that can be detected by toning equipment for extended distances and at the depths desired in the art. In addition, there is a need in the art to provide conduit that can be coupled to provide extended lengths of underground conduit that can be detected by toning equipment.

The assignee's prior U.S. Pat. Nos. 7,279,643; 7,361,835 7,820,090; and 7,880,087 and U.S. published applications 2003/0094298 and 2011/0005802 have disclosed a conduit design which addressed one or more of the above noted needs in the prior art. The assingee's U.S. Pat. Nos. 7,279,643; 7,361,835 7,820,090; and 7,880,087 and U.S. published applications 2003/0094298 and 2011/0005802 are incorporated herein by reference.

Figures 1, 2:
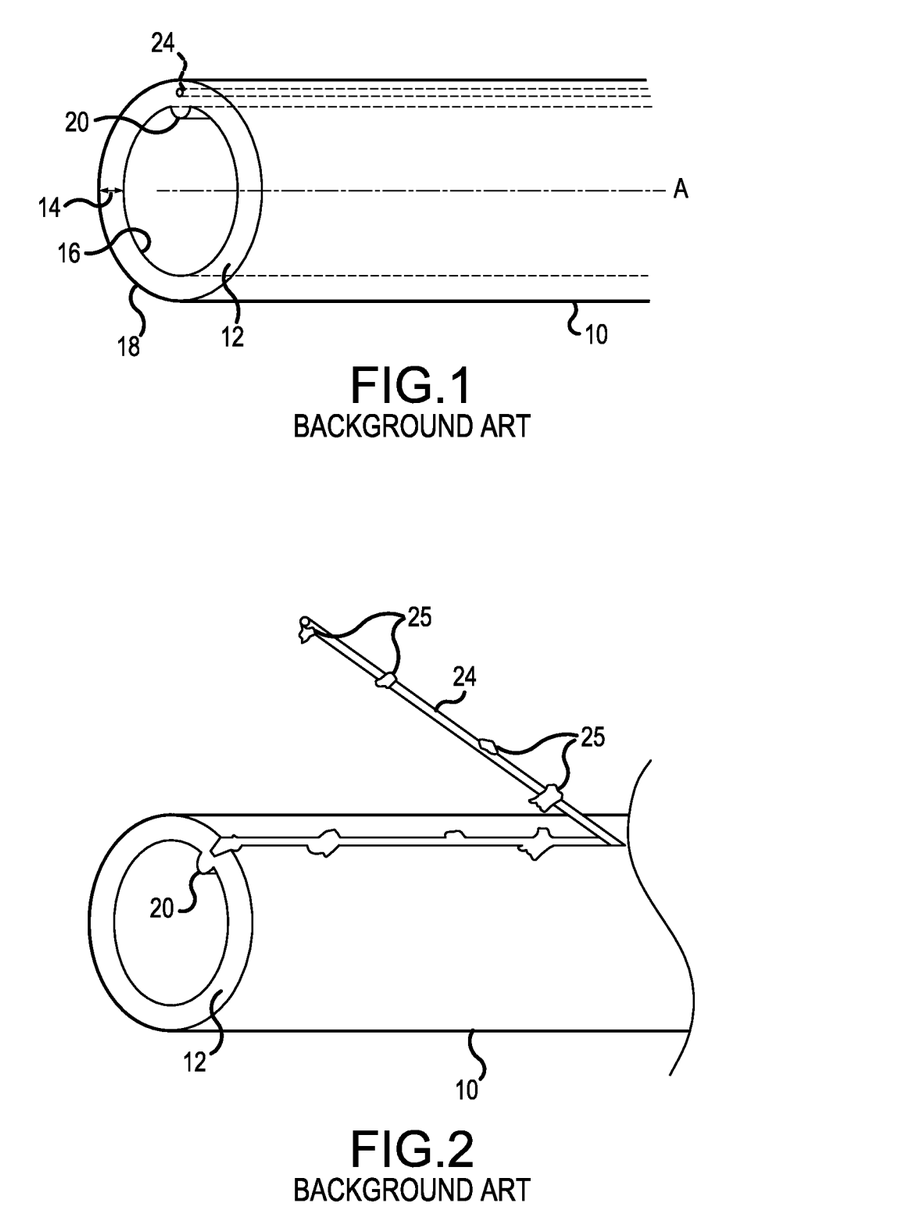
FIG. 1 is a perspective view of an end of a toneable conduit with a toning signal wire in a sidewall, in accordance with a first embodiment of the background art.
FIG. 2 is a perspective view of the conduit of FIG. 1 with a toning signal wire torn from the sidewall of the conduit, demonstrating a downside of not providing a non-stick coating on the wire.

FIG. 1 is a view of a toneable conduit 10 of Applicants' U.S. Pat. No. 7,361,835. The toneable conduit 10 is formed of an elongate polymeric tube that includes a sidewall 12 having a predetermined thickness 14 and further includes an interior surface 16 and an exterior surface 18. The exterior surface 18 is preferably smooth and circular in cross section so that the conduit 10 can be effectively coupled.

The conduit 10 includes a stabilizing rib 20 that extends longitudinally along the interior surface 16 of the conduit 10. The stabilizing rib 20 maintains the wall thickness 14 of the conduit 10, when a toning signal wire 24 that extends longitudinally along the length of the conduit 10, is torn out. The wire 24 runs continuously along the length of the conduit 10 and is embedded within the sidewall 12 of the conduit 10. In particular, the wire 24 is provided completely within the sidewall 12, and extends parallel to a central longitudinal axis (A) of the elongate polymeric tube of the conduit 10.

The wire 24 is preferably a strong, copper-clad steel wire and can transmit a toning signal along the length of the conduit 10 to allow the conduit 10, if placed underground, to be detected from the surface by toning equipment. The wire 24 is coated with a layer of a non-stick coating composition. The coating composition layer is formed of a material that prevents the wire 24 from adhering to the polymer melt used to form the elongate polymeric tube of the conduit 10.

Applicants' invention in the background art of FIG. 1 solved several problems of the prior art. For example, the wire 24 could be pulled though the sidewall 12 to permit easy coupling with another conduit or fitting. Further, the non-stick coating described in conjunction with the wire 24 of FIG. 1 allows the wire 24 to be pulled through the sidewall 12 of the conduit 10 without having portions 25 (FIG. 2) of the sidewall 12 adhered to the wire 24. In other words, the non-stick coating of the background art prevents the situation depicted in FIG. 2, wherein the conduit's sidewall 12 would be damaged as the toning signal wire 24 is pulled through it, such that leaks would be more likely to occur.

The nonstick coating of the background art permits the wire 24 to be cleanly pulled thorough the sidewall 12 of the conduit 10. However, the channel holding the wire 24 in the sidewall 12 of the conduit 10 does not permit the wire 24 to slide longitudinally within the sidewall. Rather, the wire 24 is essentially embedded within the sidewall 12 during the extrusion process. Moreover, tension placed on the polymeric tube of the conduit 10 which causes elastic deformation in the vicinity of the channel holding the wire 24, causes the channel to clamp down on and hold the wire 24 very tightly, in the same fashion as the common toy known as "Chinese handcuffs." This characteristic of the conduit 10 can lead to a drawback under certain circumstances.

For example, a potential drawback could occur in the storage of the toneable conduit 10. Toneable conduit 10 is typically stored and transported in a coil on a large spool, e.g. a three thousand foot length of conduit 10 on a single spool. Care must be taken when winding the toneable conduit 10 onto the spool, where the toneable conduit 10 has the designs of the background art. These drawbacks will be discussed in combination with FIGS. 3-5, below.

Figure 3:
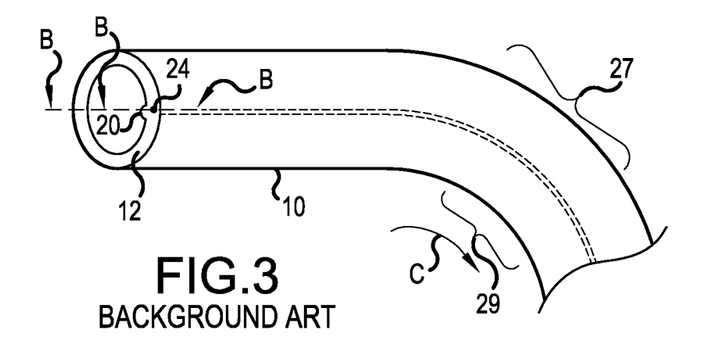
FIG. 3 is a perspective view of a section of the toneable conduit of FIG. 1 undergoing a bend with the toning signal wire at a three o'clock position.

During coiling, the wire 24 must be located at either a three o'clock position or at a nine o'clock position, so that the wire 24 is not subjected to excessive compression or tension forces. As illustrated in FIG. 3, the conduit material forming the sidewall 12 is rather elastic, and portions 27 of the sidewall 12 above the three o'clock—nine o'clock axis (B) can deform to a slightly thinner state under the tension forces imparted while bending the conduit 10 in the direction C during coiling. Likewise, portions 29 of the sidewall 12 below the three o'clock—nine o'clock axis (B) can deform to a slightly thicker state under the compression forces imparted while bending the conduit 10 in the direction C during coiling.

The wire 24 must remain basically along the three o'clock—nine o'clock axis (B) because the wire 24 (e.g., a copper-clad steel wire) cannot deform to the degree that the polymeric material of the sidewall 12 can deform. Materials (e.g., portions of the sidewall 12 and the wire 24) along the three o'clock—nine o'clock axis (B) do not experience either compression or tension, as the conduit 10 is bent in the direction C during coiling.

Figure 4:
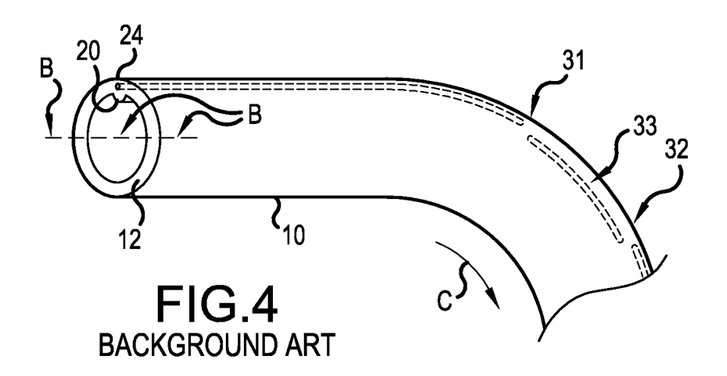
FIG. 4 is a perspective view of a section of the toneable conduit of FIG. 1 undergoing a bend with the toning signal wire at a twelve o'clock position.

The wire 24 can be damaged and the toneable conduit 10 rendered inoperable if the conduit 10 is coiled while the wire 24 is off of the three o'clock—nine o'clock axis (B). For example, as illustrated in FIG. 4, if the toneable conduit 10 were bent in the direction C during coiling while the wire 24 is disposed near the twelve o'clock position, the wire 24 would be placed under excessive tension. The wire 24 could break several times and be pulled apart, as indicated at locations 31 and 32.

Further, the tension could cause the wire 24 to tear through the rib 20 and enter the interior of the conduit 10, as indicated at location 33. This could be damaging to the communication cables within the conduit 10 from a physical standpoint and could also influence performance characteristics of an electrical communication cable, such as the crosstalk performance of a twisted pair cable. Moreover, the toneable feature of the conduit 10 is inoperable, if continuity through the wire 24 is lost.

Figure 5:
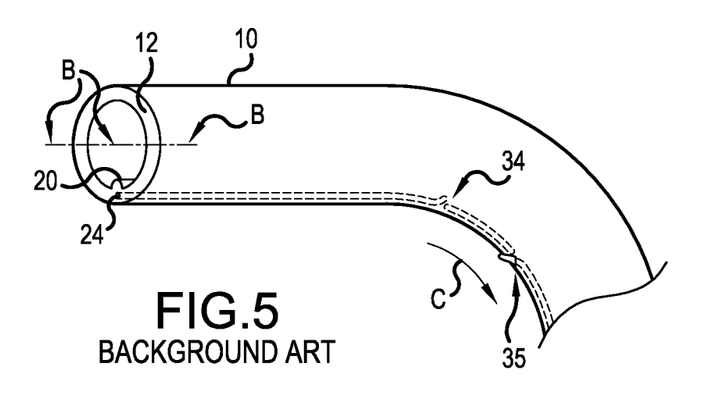
FIG. 5 is a perspective view of a section of the toneable conduit of FIG. 1 undergoing a bend with the toning signal wire at a six o'clock position.

As illustrated in FIG. 5, if the toneable conduit 10 were bent in the direction C during coiling while the wire 24 is disposed near the six o'clock position, the wire 24 would be placed under excessive compression. The wire 24 could break several times and cross over itself, as indicated at locations 34 and 35. At a crossover, the wire 24 could also protrude through the sidewall 12 and into the interior of the conduit 10, as at location 34. At a crossover, the wire 24 could also protrude through the sidewall 12 and to the exterior of the conduit 10, as at location 35. An interior protrusion, as at location 34, could be damaging to the communication cables within the conduit 10 from a physical standpoint and could also influence performance characteristics of an electrical communication cable within the conduit 10. A protrusion to the exterior of the conduit 10 can allow damaging moisture to enter the conduit 10. Moreover, the toneable feature of the conduit 10 is inoperable, if continuity through the wire 24 is lost.

It is also possible to break the wire 24 of the conduit 10 when pulling the conduit 10 during installation. For example, often times a hole is laterally bored through the ground (e.g., under a street) using a boring tool. When the hole is completed by the tool, the end of a conduit 10 is attached to the tool and the tool is withdrawn back through the bored hole, hence pulling the conduit 10 along through the hole.

During the pulling, the conduit 10 may be exposed to high tension forces due to friction within the bored hole. The polymer material of the sidewall 12 of the conduit 10 can elongate to some degree under the tension. However, the wire 24 cannot elongate to the same degree as the sidewall 12. Moreover, the elongation of the sidewall 12 causes the wire 24 to be tightly gripped within its channel in the sidewall 12, in the same manner as "Chinese handcuffs." Hence, the wire 24 will break, and the toneable feature of the conduit 10 will be inoperable. In one study, an elongation of 3 to 4% in the sidewall 12 caused the wire 24 to break, while the polymer material of the sidewall 12 could withstand elongations of up to about 8% without structural damage.

It is also possible that the wire 24 could be damaged, or at least more susceptible to damage, dependent upon the temperature of the conduit 10 during coiling and installation. The wire 24 and the polymer material of the conduit 10 have different coefficients for expansion and contraction based upon temperature. The temperature of the conduit 10 can affect the contraction gripping force applied to the wire 24 during elongation or compression of the polymeric material of the sidewall 12 during coiling and installation.

Figure 6:
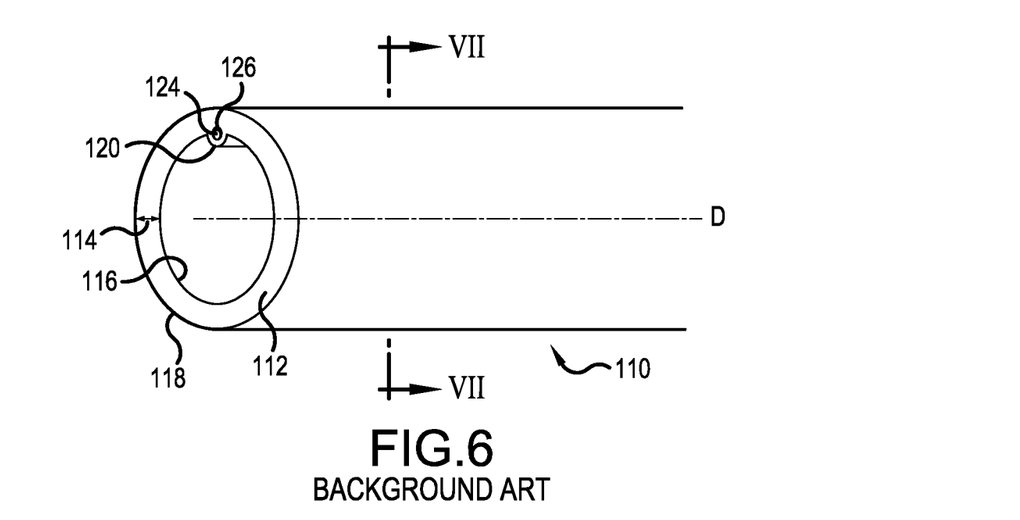
FIG. 6 a perspective view of an end of a toneable conduit with a toning signal wire in a sidewall, in accordance with the second embodiment of the background art.

The Assignee's prior U.S. Pat. No. 7,880,087 taught a cable which alleviated one or more of the drawbacks noted above. FIG. 6 is a perspective view of an end of a toneable conduit 110 with a wire 124 in a sidewall 112, in accordance with the background art of U.S. Pat. No. 7,880,087. The toneable conduit 110 is formed of an elongate polymeric tube that includes the sidewall 112 having a predetermined thickness 114. The toneable conduit 110 extends longitudinally along an axis (D).

Figure 7:
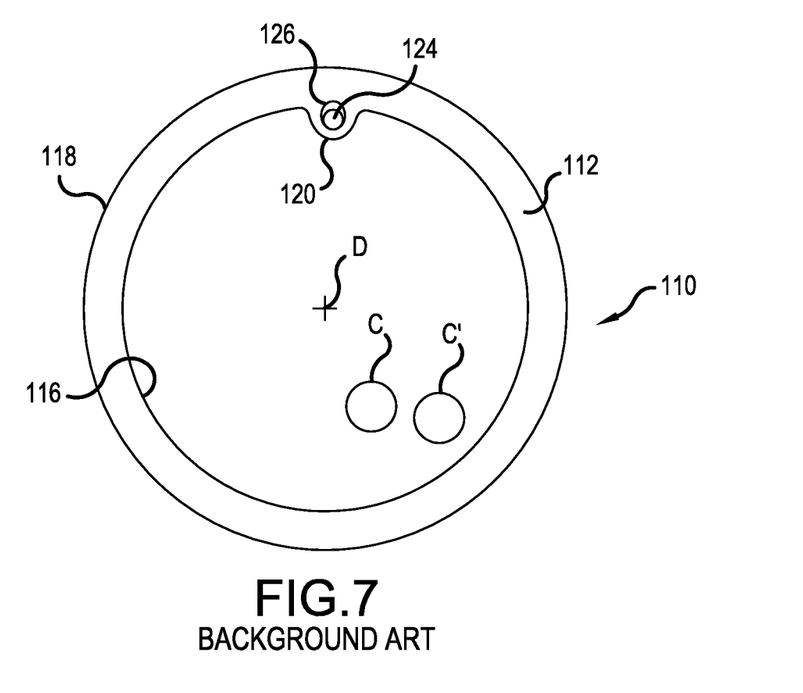
FIG. 7 is a cross sectional view taken along line VII-VII in FIG. 6.

As best seen in FIG. 7, the sidewall 112 includes an interior surface 116 and an exterior surface 118. The exterior surface 118 is preferably smooth and substantially circular in cross section, so that the conduit 110 can be effectively coupled. The interior surface 116 forms a main channel within the elongate polymeric tube for accepting at least one communication cable C, C'.

The wire 124 runs continuously along the length of the conduit 110 and is located within the sidewall 112 of the conduit 110 in a sub-channel 126. The sub-channel 126 may be integrally formed with the sidewall 112 and may be located between the interior surface 116 and the exterior surface 118 of the sidewall 112. In one embodiment, the sub-channel 126 is substantially circular in cross section and has a cross sectional area which is much smaller than a cross sectional area of the main channel. For example, the diameter of the sub-channel 126 could be about 0.12 inches, wherein the main channel could have a diameter on the order of 1.4 inches.

The wire 124 is provided loosely within the sub-channel 126 so that it may slide longitudinally therein. The wire 124 extends parallel to the central longitudinal axis (D) of the elongate polymeric tube of the toneable conduit 110. The wire 124 preferably functions as a toning signal wire 124 and is electrically conductive from a first end of the toneable conduit 110 to a second end of the toneable conduit 110. The toning signal wire 124 has a cross sectional area which is substantially less than a cross sectional area of the sub-channel 126, so that an air gap exists within the sub-channel 126 around portions of the wire 124, as best seen in the cross section view of FIG. 7.

In a preferred embodiment, a cross sectional area of the sub-channel 126 is at least about 25% larger than a cross sectional area of the toning signal wire 124. In a more preferred embodiment, the cross sectional area of the sub-channel 126 is at least about 33% larger than the cross sectional area of the toning signal wire 124. In a most preferred embodiment, the cross sectional area of said sub-channel 126 is at least about 45% larger than the cross sectional area of the toning signal wire 124.

The toning signal wire 124 is preferably a strong, copper-clad steel wire 124 and can transmit a toning signal along the length of the toneable conduit 110 to allow the toneable conduit 110 when buried to be detected from the ground surface by toning equipment. In one embodiment, the toning signal wire 124 is twenty gauge or larger, such as an eighteen gauge wire (i.e., 0.0403 inches in diameter).

In one embodiment, the exterior surface 118 of the toneable conduit 110 has a diameter of about 1.66 inches, and the interior surface 116 of the toneable conduit 110 has a diameter of about 1.40 inches.

The interior surface 116 protrudes inwardly toward the center D of the elongated tube of the toneable conduit 110 immediately below the sub-channel 126 to form an interior surface 116 with a rib 120. The rib 120 may facilitate the installation of the cables C, C' within the main channel of the toneable conduit 110 by reducing friction as the cables C, C' are pulled into the toneable conduit 110.

In one embodiment, the toning signal wire 124 is coated with a layer of a non-stick coating composition. The coating composition layer is formed of a material that prevents the toning signal wire 124 from adhering to the polymer melt used to form the toneable conduit 110. For example, the toning signal wire 124 would be coated with a material, which would not stick to a polyethylene material, used to form the elongate polymeric tube of the conduit 110. In one embodiment, the toning signal wire 124 may include a layer of polytetrafluoroethylene. In a more preferred embodiment, the toning signal wire 124 is coated with silicone grease, polytetrafluoroethylene, or a combination of both substances. However, it should be noted that other non-stick substances, such as PVC and polypropylene, may be employed. The toning signal wire 124, once coated, may assume a larger diameter, such as about 0.058 inches in diameter.

By the above configuration of FIGS. 6 and 7, the toning signal wire 124 is free to slide longitudinally within the sub-channel 126 under certain circumstances. Therefore, compression and tension forces placed upon the toneable conduit 110 will not directly pass to the toning signal wire 124 under certain circumstances. For example, if the portion of the sidewall 112 containing the sub-channel 126 in the last few hundred feet of the toneable conduit 110 is placed under tension, as illustrated in the bending scenario of FIG. 4, the toning signal wire 124 will recede/withdraw into the end of sub-channel 126, rather than being broken and pulled apart, as in the background art. Also, if the portion of the sidewall 112 containing the sub-channel 126 in the last few hundred feet of the toneable conduit 110 is placed under compression, as illustrated in the bending scenario of FIG. 5, the toning signal wire 124 will protrude from the end of sub-channel 126, rather than being broken and overlapping itself, as in the background art.

Another advantage of the background art of U.S. Pat. No. 7,880,087 occurs when the toneable conduit 110 is being pulled through a bored hole, the sidewall 112 of the toneable conduit 110 can be elastically deformed to a much greater extent, as compared to the background art, before the sub-channel 126 will clamp down on the toning signal wire 124. In the Chinese handcuffs analogy, it would be akin to the functioning of the handcuffs on adult fingers versus smaller children's fingers. The handcuff would need to be pulled or elongated further before the children's fingers would be clamped by the cuffs.

In the background art of FIGS. 1-5, an elongation of the sidewall 12 of perhaps 3 to 4% resulted in the breaking of the wire 24. In the structures shown in U.S. Pat. No. 7,880,087 and FIG. 6-7, the elongation of the sidewall 112 could be perhaps 5 to 6% before the wire 124 is broken. Indeed, if the cross section of the sub-channel 126 is large enough as compared to the cross section of the toning signal wire 124, it would be possible that the elongation of the sidewall 112 could reach its failure point (e.g., about 8%) prior to breaking of the toning signal wire 124 within the sub-channel 126.

SUMMARY OF THE INVENTION

The Applicant has appreciated one or more drawbacks associated with the conduits of the prior art and the Assignee's own background art.

It is an object of the present invention to address one or more of the drawbacks of the prior art toneable conduits discussed above and/or the Assignee's appreciated needs in the art of toneable conduits.

For example, as described in paragraph 032 above, the toning signal wire 124 may protrude and retract within the sub-channel 126 only when bending occurs at the ends of the toneable conduit 110. Sliding movement of the toning signal wire 124 within the sub-channel 126 is not possible in the mid-portions of the length of toneable conduit 110 due to frictional forces. It is an object of the present invention to improve the performance of the toneable conduit by allowing some movement (expansion and/or contraction) of the toning signal wire relative to the sub-channel in the mid-portions of the toneable conduit.

As another example, as described in paragraph 034 above, the sub-channel 126 allows longitudinal elongation of the toneable conduit 110 up to approximately 5 to 6% before the toning signal wire 124 is broken because of the "Chinese handcuff" effect. Under some circumstances, the toneable conduit 110 can elongate up to 8% before sidewall 112 necks down and fails. U.S. Pat. No. 7,880,087 would require the sub-channel 126 to be made very large to accommodate such an elongation without damage to the toning signal wire 124. Over sizing the sub-channel 126 leads to downsides, such as an increased sidewall thickness 114 and potential manufacturing instabilities. It is an object of the present invention to improve the performance of the toneable conduit by protecting the continuity of the toning signal wire while allowing elongation of the sidewall 112 of the toneable conduit 110 up to a potential failure point and while not requiring a greatly oversized sub-channel 126.

These and other objects are accomplished by a toneable conduit including an elongate polymeric tube having a sidewall with an interior surface and an exterior surface. The interior surface defines a main channel. A sub-channel, smaller in cross sectional area than the main channel, extends longitudinally between the exterior and interior surfaces of the tube. A continuous toning signal wire is located within the sub-channel. The sub-channel has a larger cross sectional area than a cross sectional area of the toning signal wire and the toning signal wire follows a zigzagging or undulating path within the sub-channel. Alternatively, the sub-channel and toning signal wire have a substantially common cross sectional area and both follow a zigzagging or undulating path from one end of the toneable conduit to the other end. In both embodiments, a given length of toneable conduit will include a length of toning signal wire exceeding that given length.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 8:
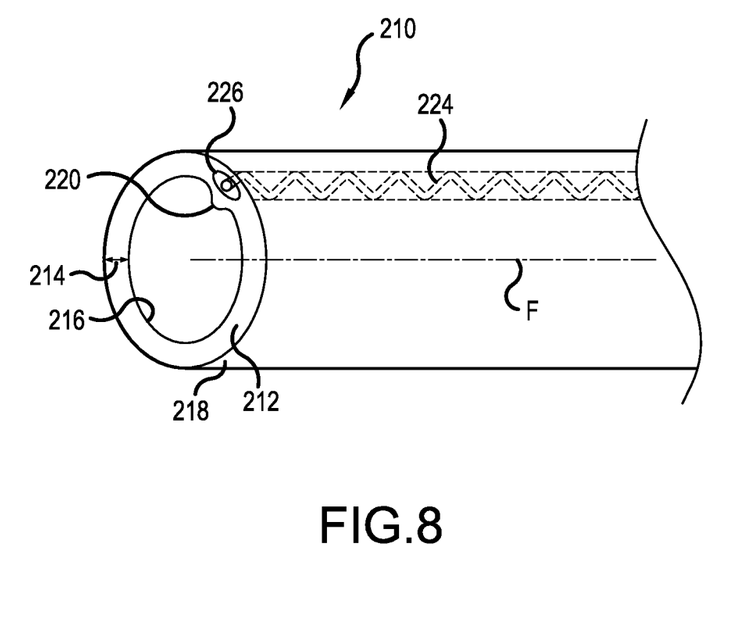
FIG. 8 is a perspective view of an end of a toneable conduit with a toning signal wire in a sidewall, in accordance with a first embodiment of the present invention.
Figure 9:
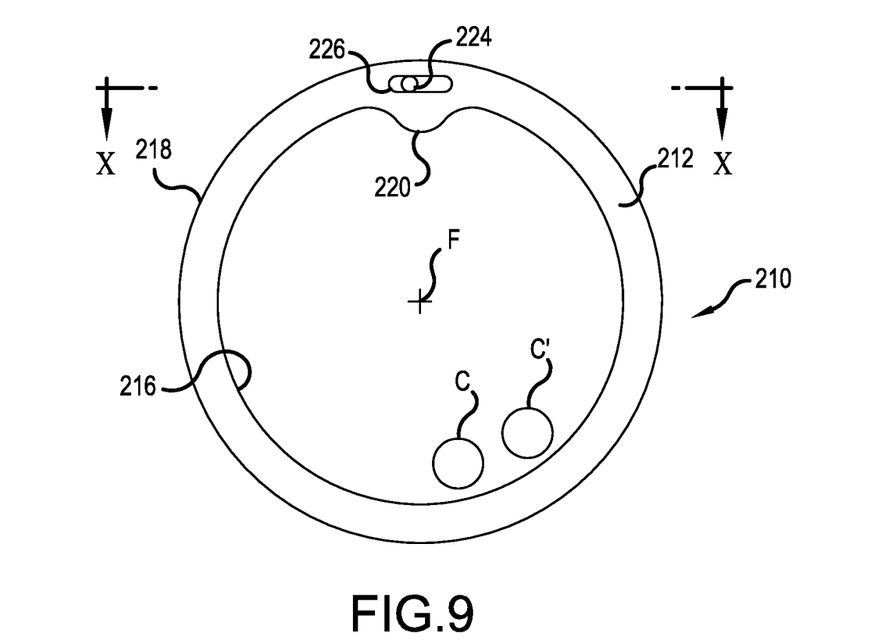
FIG. 9 is an end view of the toneable conduit of FIG. 8.

FIG. 8 is a perspective view of an end of a toneable conduit 210, in accordance with a first embodiment of the present invention, and FIG. 9 is the end view of the toneable conduit of FIG. 8. The toneable conduit 210 is formed of an elongate polymeric tube that includes a sidewall 212 having a predetermined thickness 214. The toneable conduit 210 extends longitudinally along an axis (F).

As best seen in FIG. 9, the sidewall 212 includes an interior surface 216 and an exterior surface 218. The exterior surface 218 is preferably smooth and substantially circular in cross section, so that the conduit 210 can be effectively coupled. The interior surface 216 forms a main channel within the elongate polymeric tube for accepting at least one communication cable C, C'.

A wire 224 runs continuously along the length of the conduit 210 and is located within the sidewall 212 of the conduit 210 in a sub-channel 226. The sub-channel 226 may be integrally formed with the sidewall 212 and may be located between the interior surface 216 and the exterior surface 218 of the sidewall 212. In one embodiment, the sub-channel 226 is substantially oval in cross section and has a cross sectional area which is much smaller than a cross sectional area of the main channel. The sub-channel 226 may have other cross sectional shapes, such as being approximately rectangular in its cross sectional shape.

The wire 224 is provided loosely within the sub-channel 226. The wire 224 preferably functions as a toning signal wire 224 and is electrically conductive from a first end of the toneable conduit 210 to a second end of said toneable conduit 210. The toning signal wire 224 has a cross sectional area which is substantially less than a cross sectional area of the sub-channel 226, so that an air gaps exist within the sub-channel 226 around portions of the toning signal wire 224.

Figure 10:
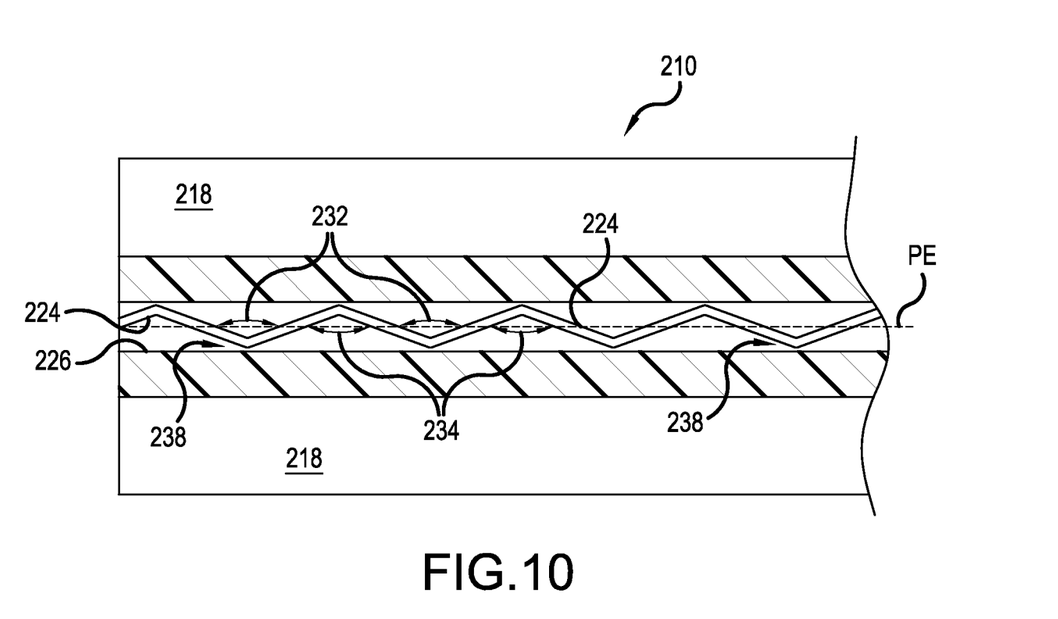
FIG. 10 is a cross sectional view taken along line X-X in FIG. 9.

As best seen in the cross section view of FIG. 10, the toning signal wire 224 undulates relative to the longitudinal direction F of the elongated tube, waving back and forth as it traverses from the first end of the toneable conduit 210 to the second end of the toneable conduit 210. The undulation may be formed by a series of obtuse angles 232 and 234. In the depicted embodiment, the angles 232 and 234 are equal to each other and are greater than about 130 degrees. In a more preferred embodiment, the angles 232 and 234 are in the range of about 135 degrees to about 170 degrees, and more preferably in the range of about 140 degrees to about 160 degrees.

As best seen in the cross section view of FIG. 10, the toning signal wire 124 undulates relative to the longitudinal direction F of the elongated tube, waving back and forth as it traverses from the first end of the toneable conduit 210 to the second end of the toneable conduit 210. The undulation may be formed by a series of obtuse angles 232 and 234. In the depicted embodiment, the angles 232 and 234 are equal to each other and are greater than about 130 degrees. In a more preferred embodiment, the angles 232 and 234 are in the range of about 135 degrees to about 170 degrees, and more preferably in the range of about 140 degrees to about 160 degrees.

By undulating the toning signal wire 224 within the sub-channel 226, a first given length of sub-channel 226 or toneable conduit 210 will include a second length of toning signal wire 224, where the second length is longer than the first length. In other words, if the undulations were removed by pulling the toning signal wire 224 straight, the length of the toning signal wire 224 within a given length of toneable conduit 210 would be longer than the given length of toneable conduit 210. In one embodiment, the second length of the toning signal wire 224 is at least 101% of the first length of said toneable conduit 210. In a preferred embodiment, the second length of the toning signal wire 224 is about 102% to about 109% of the first length of the toneable conduit 210. In another embodiment, the second length of the toning signal wire 224 is at least 103% of the first length of the toneable conduit 210.

The angles 232 and 234 of the undulations define the extent to which the toning signal wire length (if pulled straight to remove the undulations) will exceed the length of the toneable conduit 210. Angles approaching one hundred eighty degrees provide less extended length to the toning signal wire 224, while angles 232 and 234 approaching ninety degrees provide more extended length to the toning signal wire 224. The table below illustrates several values for angles 232/234 and the resulting extended length of the toning signal wire 224 in percentage relative to the given length of toneable conduit 210.

TABLE 1

| Undulation Angles (in degrees) | Length of Toning Wire Relative Conduit (in %) |
|---|---|
| 170° | 100.38% |
| 168° | 100.55% |
| 163.86° | 101% |
| 160° | 101.54% |
| 157.27° | 102% |
| 155° | 102.42% |
| 152.28° | 103% |
| 150° | 103.53% |
| 148.12° | 104% |
| 146° | 104.57% |
| 144.49° | 105% |
| 142° | 105.76% |
| 141.26° | 106% |
| 140° | 106.76% |
| 138.32° | 107% |
| 137° | 107.48 |
| 135.62° | 108% |

Although the angles of undulation 232 and 234 have been shown as being equal, it would also be possible to bend the toning signal wire 224 using unequal undulation angles. In other words, the angular degree measurement of angle 232 need not be the same as the angular degree measurement of angle 234, e.g., the series 155°, 150°, 155°, 150°, ... could be a possibility. Moreover, each of the angles 232 along the series need not be equal, and each of the angles 234 along the series need not be equal. Hence, the series 155°, 150°, 154°, 149°, 153°, 148°, 155°, 150°, ... would be a possibility within the scope of the invention.

A primary feature of the undulations is than the toning signal wire 224 travel in a first direction over an axis of primary extension (PE) of the toning signal wire 224, then bend to travel back across the axis of primary extension (PE), then bend to travel back across the axis of primary extension (PE), and so forth. In one embodiment, the axis of primary extension (PE) of the toning signal wire 224 is parallel to the longitude axis (F) of the toneable conduit 210, however a parallel relationship is not always necessary, as the axis of primary extension (PE) may travel in a helix around the longitudinal axis (F), and several of the benefits of the invention may be accomplished, albeit at the expense of additional toning signal wire 224.

In a preferred embodiment, a cross sectional area of the sub-channel 226 is at least about 75% larger than a cross sectional area of the toning signal wire 224. In a more preferred embodiment, the cross sectional area of the sub-channel 226 is at least about 100% larger than (i.e., twice as large as) the cross sectional area of the toning signal wire 224. In a most preferred embodiment, the cross sectional area of said sub-channel 226 is at least three times as large as the cross sectional area of the toning signal wire 224, such as four times larger than the cross sectional area of the toning signal wire 224, as approximately depicted in FIGS. 8-10.

The toning signal wire 224 is preferably a strong, copper-clad steel wire 224 and can transmit a toning signal along the length of the toneable conduit 210 to allow the toneable conduit 210 when buried to be detected from the ground surface by toning equipment. In one embodiment, the toning signal wire 224 is twenty gauge or larger, such as an eighteen gauge wire (i.e., 0.0403 inches in diameter) and may be annealed.

In one embodiment, the exterior surface 218 of the toneable conduit 210 has a diameter of about 1.66 inches, and the interior surface 216 of the toneable conduit 210 has a diameter of about 1.40 inches.

The interior surface 216 protrudes inwardly toward the center axis (F) of the elongated tube of the toneable conduit 210 immediately below the sub-channel 226 to form an interior surface 216 with a rib 220. The rib 220 may facilitate the installation of the cables C, C' within the main channel of said toneable conduit 210 by reducing friction as the cables C, C' are pulled into the toneable conduit 210.

In one embodiment, the toning signal wire 224 is coated with a layer of a non-stick coating composition. The coating composition layer is formed of a material that prevents the wire 224 from adhering to the polymer melt used to form the toneable conduit 210. For example, the toning signal wire 224 would be coated with a material, which would not stick to a polyethylene material, used to form the elongate polymeric tube of the toneable conduit 210. In one embodiment, the toning signal wire 224 may include a layer of polytetrafluoroethylene. In a more preferred embodiment, the toning signal wire 224 is coated with silicone grease, polytetrafluoroethylene, or a combination of both substances. However, it should be noted that other non-stick substances, such as PVC, nylon and polypropylene, may be employed. The toning signal wire 224, once coated, may assume a larger diameter, such as about 0.058 inches in diameter.

Figure 11:
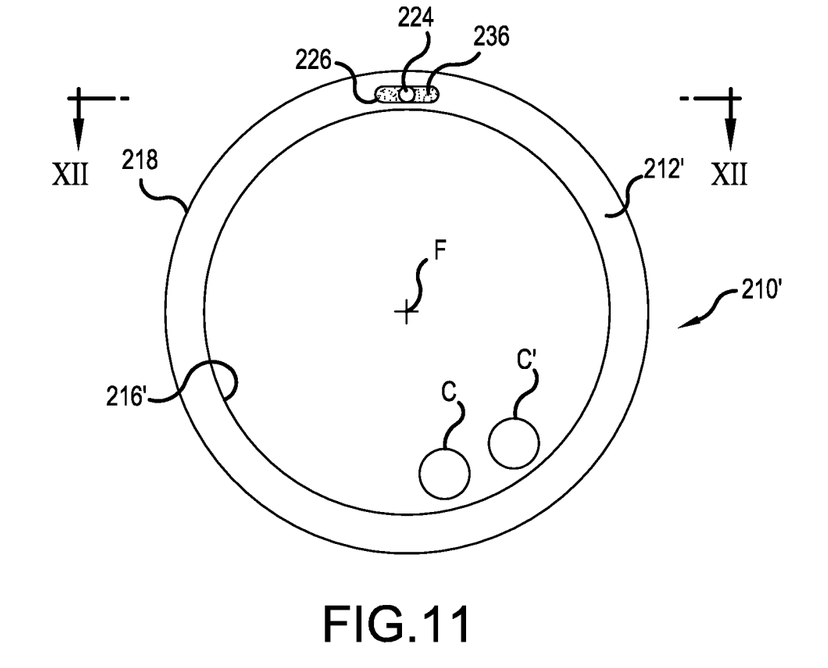
FIG. 11 is an end view of a toneable conduit with a toning signal wire in a sidewall, in accordance with a second embodiment of the present invention.
Figure 12:
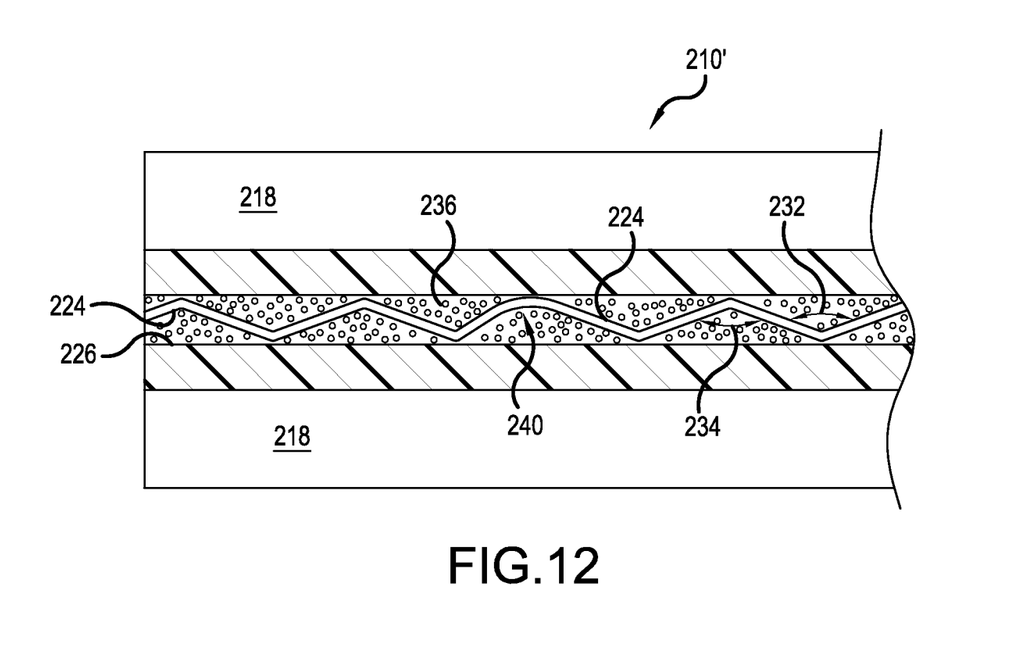
FIG. 12 is a cross sectional view taken along line XII-XII in FIG. 11.

FIG. 11 is an end view similar to FIG. 9, but illustrating a second embodiment of the toneable conduit 210', and FIG. 12 is a cross sectional view taken along line XII-XII in FIG. 11. Like elements have been labeled with the same reference numerals. FIG. 11 illustrates that the sub-channel 126 of FIGS. 8-10 may be filled with a water-blocking agent 236 in areas where the toning signal wire 224 does not exist, as opposed to the air shown in the first embodiment of FIGS. 8-10. The water-blocking agent 236 may be any material known in the cabling art for blocking the infiltration of water into a cable, such as mineral oil, silicon, rubber or a water blocking powder (e.g., cross-linked sodium polyacrylate).

Figure 15:
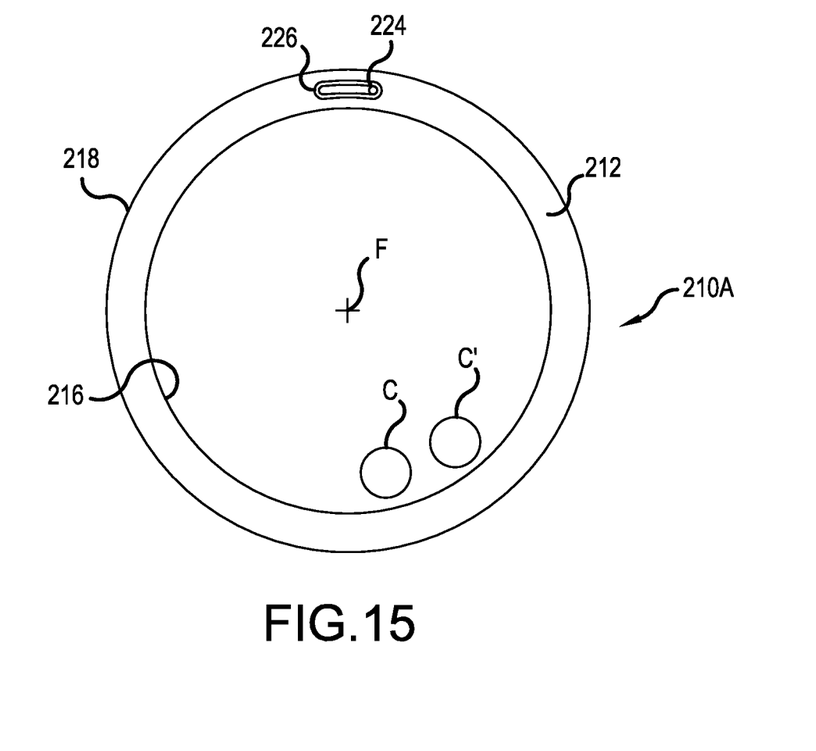
FIG. 15 is an end view of a toneable conduit with a toning signal wire in a sidewall, showing a modified version of the first embodiment of the present invention.

Another different feature in FIG. 11 as compared to FIGS. 8 and 9 is that rib 220 is not present on the side wall 212'. Hence, the interior surface 216' is circular. The rib 220 is considered an optional feature in the present invention, and hence may be removed in the first embodiment illustrated in FIGS. 8 and 9, as well, as depicted in the modified toneable conduit 210A of FIG. 15.

Figure 13:
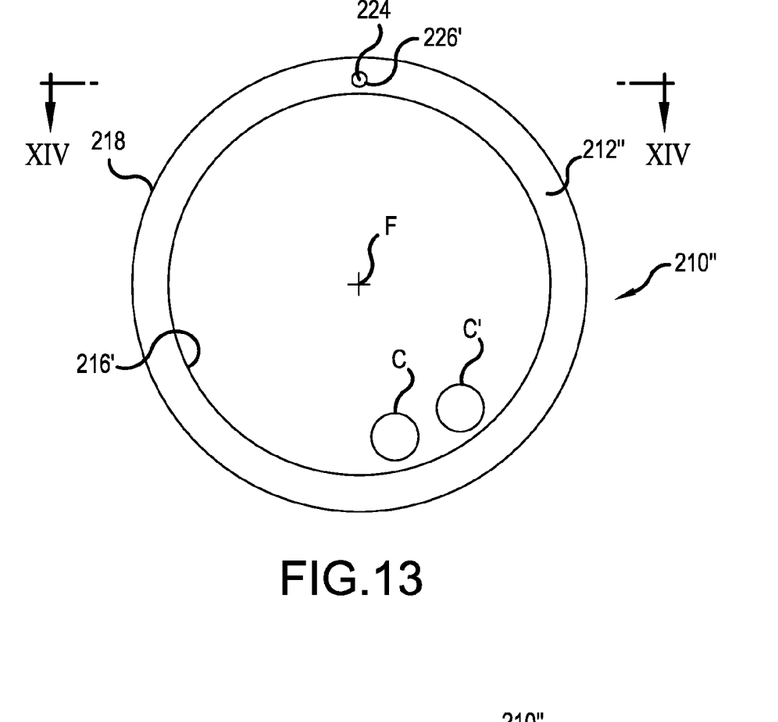
FIG. 13 is an end view of a toneable conduit with a toning signal wire in a sidewall, in accordance with a third embodiment of the present invention.
Figure 14:
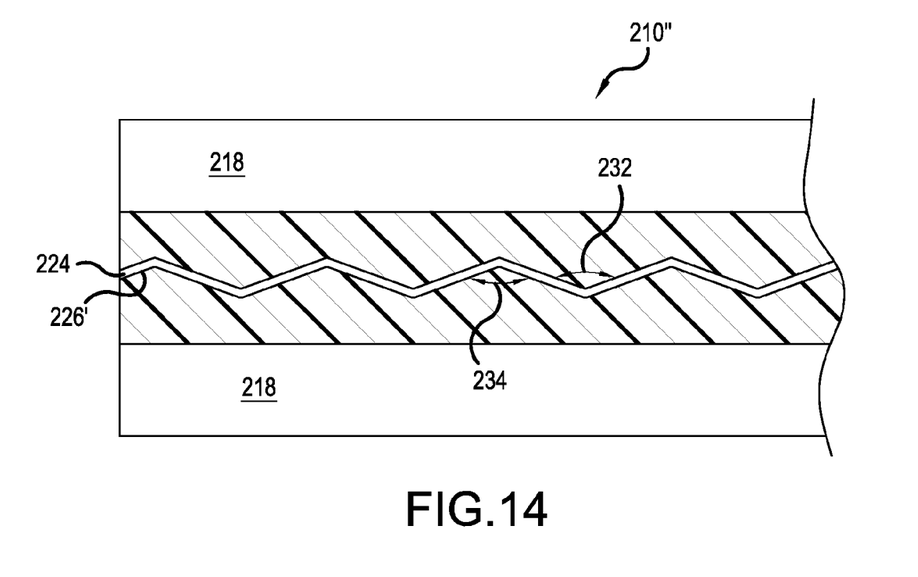
FIG. 14 is a cross sectional view taken along line XIV-XIV in FIG. 13.

FIG. 13 is an end view similar to FIG. 11, but illustrating a third embodiment of the toneable conduit 210", and FIG. 14 is a cross sectional view taken along line XIV-XIV in FIG. 13. Like elements have been labeled with the same reference numerals. FIGS. 13 and 14 illustrate that the sub-channel 226 of FIGS. 8-12 may be reduced in size to approximately be the same as a cross sectional area of the toning signal wire 224, such that no air or water-blocking agent surrounds the toning signal wire 224 in the smaller sub-channel 226'.

As best seen in FIG. 14, the sub-channel 226' and the toning signal wire 224 both undulate along the length of the toneable conduit 210". In effect the toning signal wire 214 is directly embedded into the sidewall 212" of the toneable conduit 210".

If the portion of the toneable conduit 210" containing the toning signal wire 224 is elongated during reeling or installation, the tensile strength of the toning signal wire 224 will allow the toning signal wire 224 to partially tear through the material forming the sidewall 212'. In other words, the angles 232 and 234 can enlarge, or spread open, as the toning signal wire 224 cuts through the sidewall material within the apex of the angles 232 and 234. This allows the toning signal wire 224 to accommodate elongation of the sidewall 212" without breaking.

If the force creating elongation of the sidewall 212" is released (e.g., the boring tool finishes pulling the toneable conduit 210" through the bored hole) and the conduit retracts back to an initial state, the toning signal wire 224 can move back out of the cut material within the apexes of the angles 232 and 234 to reseat back into the original angles 232, 234, as depicted in FIG. 14.

If the portion of the toneable conduit 210" containing the toning signal wire 224 is compressed during reeling or installation, the toning signal wire 224 can partially tear into the material forming the sidewall 212". In other words, the angles 232 and 234 can become more acute, or close, as the toning signal wire 224 cuts into the sidewall material outside or above the apex of the angles 232 and 234. This allows the toning signal wire 224 to accommodate slight compression of the sidewall 212" without breaking.

If the force creating compression of the sidewall 212" is released and the toneable conduit 210" expands back to an initial state, the toning signal wire 224 can move back out of the cut material outside the apexes of the angles 232 and 234 to reseat back into the original angles 232, 234, as depicted in FIG. 14.

In order to couple the end of the toneable conduit to another structure, one needs to remove the toning signal wire 224 from the sidewall 212, 212', 212" of the various embodiments of the invention. One method is to cut way the sidewall 212, while being careful not to cut the toning signal wire 224. Alternatively, one can free up a small end portion of the toning signal wire 224 by cutting, use a vise grip tool to tightly clamp onto the freed end portion of the toning signal wire 224 and then, the wire 124 can be torn through the sidewall 212 to the exterior of the toneable conduit, as described in further detail in the Assignee's prior U.S. patents and published applications, as previously incorporated herein by reference.

The method of making the toneable conduit may be performed in accordance with the disclosures found in the Assignee's prior U.S. patents and published applications, as previously incorporated herein by reference. However, the toning signal wire 224 is bent in a series of angles 232 and 234 prior to being incorporated into the sub-channel 226, 226', and the water blocking agent 236 is introduced into the sub-channel 226, if practicing the second embodiment of the present invention.

In general, the method of forming the toneable conduit includes extruding an elongate polymeric tube having a sidewall with an interior surface and an exterior surface, wherein the interior surface defines a main channel of the toneable conduit; forming a sub-channel during the extruding step, wherein the sub-channel has a smaller cross sectional area than the main channel, and wherein the sub-channel is formed between the interior surface and exterior surface of the sidewall of the elongate polymeric tube; bending a continuous wire to form undulations; and feeding the bent, continuous wire into the sub-channel during the extruding step.

The bending of the toning signal wire may occur just prior to the toning signal wire being fed into the sub-channel, whereby a linear wire is feed from a spool and bend angles 232 and 234 are formed into the toning signal wire just prior to entering the sub-channel in the sidewall of the extruded conduit. Alternatively, a bent toning signal wire may be stored on a spool and the toning signal wire is fed from the spool into the sub-channel in the sidewall of the extruded conduit.

By the above configurations, the toning signal wire 224 is allowed movement (expansion and/or contraction) within the sidewall 212, 212', 212" at any point along the toneable conduit. In the first and second embodiments, the toning signal wire 224 can move within the sub-channel 226 in the ends portion and in the mid-portions of the toneable conduit by increasing or decreasing the angles 232, 234 of undulation. The angles of undulation 232, 234 may slightly decrease due to play, or space, within the sub-channel 226, as shown at reference numerals 238 in FIG. 10. Alternatively, if spaces 238 at not present or are insufficient to accommodate the compression of the sidewall 212, 212', 212", segments of the toning signal wire 224 between the angles of undulation 232, 234 can slightly bow (as shown at reference number 240 in FIG. 12).

In the third embodiment, the tensile strength of the toning signal wire 224 and undulating configuration of the toning signal wire 224, as it is embedded into the sidewall 212" permit the toning signal wire 224 to partially tear the interior material of the sidewall 212" within or opposite the apexes of the angles 232, 234 of the undulations to permit elongation and/or contraction of the toning signal wire 224, as the toneable conduit 210" is elongated or contracted.

In the background art of FIGS. 6 and 7, the toning signal wire 124 was only permitted to move in sub-channel 126 near to the ends of the toneable conduit. Hence, the first, second and third embodiments of the present invention are improvements in that the advantages described in conjunction with FIGS. 6 and 7 may be accomplished not only at the ends of the toneable conduit, but also in the middle portions of the toneable conduit.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A toneable conduit comprising:
a polymer material forming an elongated tube;
a main channel formed within said elongated tube for accepting at least one communication cable, said main channel extending longitudinally along said elongated tube;
a sub-channel formed within said elongated tube; and
a toning signal wire resident within said sub-channel, said toning signal wire being electrically conductive from a first end of said toneable conduit to a second end of said toneable conduit, and said toning signal wire undulating along the longitudinal direction of said elongated tube, waving back and forth from said first end of said toneable conduit to said second end of said toneable conduit.

2. The toneable conduit according to claim 1, wherein said undulations include angles of greater than about 130 degrees.

3. The toneable conduit according to claim 1, wherein said undulation include angles in the range of about 135 degrees to about 170 degrees.

4. The toneable conduit according to claim 1, wherein said undulation include angles in the range of about 140 degrees to about 160 degrees.

5. The toneable conduit according to claim 1, wherein a cross sectional area of said sub-channel is approximately the same as a cross sectional area of said toning signal wire.

6. The toneable conduit according to claim 1, wherein a cross sectional area of said sub-channel is greater than a cross sectional area of said toning signal wire, such that said toning signal wire undulates within said sub-channel.

7. The toneable conduit according to claim 6, wherein said sub-channel is approximately oval or rectangular in cross section and wherein air fills the voids in said sub-channel where said toning signal wire does not exist.

8. The toneable conduit according to claim 6, wherein a watering blocking agent fills the voids in said sub-channel where said toning signal wire does not exist.

9. The toneable conduit according to claim 1, wherein said sub-channel is integrally formed with a sidewall defining said main channel, and wherein said sidewall defining said main channel includes an exterior surface and an interior surface, and wherein said sub-channel resides between said exterior surface and said interior surface.

10. The toneable conduit according to claim 9, wherein said interior surface protrudes inwardly toward a center of said elongated tube immediately below said sub-channel to form an interior surface with a rib to facilitate the installation of cables within said main channel of said toneable conduit.

11. The toneable conduit according to claim 9, wherein said toning signal wire has sufficient strength to tear through said exterior wall of said toneable conduit.

12. The toneable conduit according to claim 1, wherein a cross sectional area of said sub-channel is at least about three times larger than a cross sectional area of said toning signal wire.

13. The toneable conduit according to claim 1, wherein said toning signal wire is coated with a coating composition that prevents said toning signal wire from adhering to said polymer material of said elongated tube.

14. The toneable conduit according to claim 1, wherein said toning signal wire is a copper-clad steel wire and wherein said polymer material is high density polyethylene.

15. A toneable conduit comprising:
an elongate polymeric tube having a sidewall with an interior surface and a round smooth exterior surface, said interior surface defining a main channel of said toneable conduit;
a sub-channel, smaller in cross sectional area than said main channel, wherein said sub-cannel resides between said exterior surface and said interior surface; and
an electrically continuous wire located within said sub-channel, wherein said wire is capable of transmitting a toning signal to allow said toneable conduit to be detected by toning equipment, and wherein a first length of said toneable conduit contains a second length of said wire, and wherein said second length is at least 101% of said first length.

16. The toneable conduit according to claim 15, wherein said second length is about 102% to about 109% of said first length.

17. The toneable conduit according to claim 15, wherein said second length is at least 103% of said first length.

18. The toneable conduit according to claim 15, wherein said sub-channel has a cross sectional area which is approximately equal to a cross sectional area of said toning signal wire, and wherein said sub-channel and said toning signal wire both undulate along said first length of the said toneable conduit.

19. The toneable conduit according to claim 15, wherein said sub-channel has a cross sectional area which is larger than to a cross sectional area of said toning signal wire, and wherein said toning signal wire undulates within said sub-channel.

20. A method of forming toneable conduit comprising:
- extruding an elongate polymeric tube having a sidewall with an interior surface and an exterior surface, wherein the interior surface defines a main channel of the toneable conduit;
- forming a sub-channel during said extruding step, wherein the sub-channel has a smaller cross sectional area than the main channel, and is formed between the interior surface and exterior surface of the sidewall of the elongate polymeric tube;
- bending a continuous wire to form undulations; and
- feeding the bent, continuous wire into the sub-channel during said extruding step.

\* \* \* \* \*